UNITED STATES PATENT OFFICE.

ELMER A. SPERRY, OF BROOKLYN, NEW YORK, ASSIGNOR TO GOLDSCHMIDT DETINNING COMPANY, OF NEW YORK, N. Y., A CORPORATION OF NEW JERSEY.

PROCESS OF PRODUCING CLEAR STANNIC-CHLORID SOLUTIONS.

967,990.  Specification of Letters Patent.  Patented Aug. 23, 1910.

No Drawing.  Application filed August 1, 1908. Serial No. 446,437.

*To all whom it may concern:*

Be it known that I, ELMER A. SPERRY, a citizen of the United States, residing at Brooklyn, in the county of Queens and State of New York, have invented new and useful Improvements in the Process of Producing Clear Aqueous Solutions from Anhydrous Stannic Chlorid, of which the following is a specification.

My invention relates to the process for producing clear aqueous solutions from anhydrous stannic chlorid and it consists of the details of procedure and steps in the process hereinafter clearly set forth and pointed out in the claims.

Difficulty has been experienced in attempting to produce aqueous solutions from anhydrous or fuming stannic chlorid and in producing these solutions transparent, clear or "brilliant" as this quality is denominated. I have found that this difficulty arises from the great tendency of this material to decompose or "hydrolyze" in the presence of water in excess and also at the higher temperatures. It therefore becomes important in making solutions to keep the temperature down and also to avoid low points of dilution.

Owing to the great liberation of heat in bringing anhydrous stannic chlorid and water together and also owing to the ready hydrolysis and decomposition of this substance into hydrochloric acid and hydrated oxid of tin, it has been found difficult to produce solutions which are clear. This arises also from the fact that the hydrated oxid of tin is a brilliantly white substance produced in an extremely high state of subdivision, the solutions being heavy and the solid being comparatively light; the material readily remains in suspension and imparts turbidity or a clouded appearance to the solution. For many uses this cloudiness is prohibitive and it therefore becomes important to devise a process for producing solutions which can invariably be depended upon as being free from this serious defect.

I will now describe my process of producing solutions: This consists in suitably preparing a clear starting solution, which after being prepared is continuously and carefully maintained at a density above the hydrolyzing point.

I prefer to proceed in the following manner: Beginning preferably with a small amount of $SnCl_4$, water is added slowly until the whole amount has been converted into hydrated stannic chlorid. At this point about 25% of the water has been added. If this process be performed in a vessel with non-metallic walls and especially of such a character as not to rapidly carry off the heat of formation, the hydrated $SnCl_4$ will be found in its molten state. This is always true when the temperature is above 80° C. or thereabout. The material once molten, will however not congeal at a point considerably below this temperature. I now proceed under conditions of suitable agitation and cooling to dilute this molten hydrate until a solution of about 25° Bé. is obtained which may be considered as a suitable strength for the starting solution. I have found that by a wrong procedure it is very easy to cause this solution to become milky, as above pointed out, and thus rendered unfit, in so far as it may be useful as a starting material for forming a clear solution of $SnCl_4$ inasmuch as the milkiness is quickly disseminated throughout the whole mass. I have found that a correct procedure from this point is to add pure $SnCl_4$ to build up the starting solution to the proper point, usually between 60 and 70 Bé. and afterward to add water or weak working liquor or "bath" and then more fuming $SnCl_4$—or the heavy solution may be added to the working bath up to the requirements of the particular skeins or material under treatment. For the formation of large quantities of solution, water is added at this point preferably slowly to reduce but not to, or in fact anywhere near to the hydrolyzing point of the material, whereupon more fuming chlorid is added to strengthen the solution from this point and so on until the requisite quantity of solution has been made up. Attention is called to the fact that this quantity is usually in excess of the immediate demand. The fact is that an excess should exist, inasmuch as the excess is always utilized for the starting point of the next "batch" or quantity. A variation from this is permissible as follows, instead of the alternate addition of fuming bichlorid and water, they may go on simultaneously but then only under conditions of more or less vigorous agitation and in different portions of the bath. Non-metallic walls are always preferable for this work and adequate means for removing the heat produced are necessary, especially where there is insufficient radiation and especially where the solutions are to be made clear and with any particular rapidity and I have found it important also where they are to be made in commercial quantities.

Thus it will be seen that it is essential to start with a solution preferably containing more than 5% of tin, and strengthen; in adding water the solution must not fall to a point where hydrolyzation takes place at the temperature at which the solution stands and this must be true at any local point in the solution, which is only avoided by thorough mixing. The temperature of the solution should be kept below 105° C. and preferably should not be allowed to exceed from 80 to 90° C. in temperature and furthermore it is usually made in excess of the demand the excess being utilized as a starting solution for a succeeding "batch" or quantity.

As an alternate proceeding to the above, it may be stated that the fuming bichlorid may be added directly to the working bath but even here some water must be added to make up for the loss in water in the solution removed with the skeins or yarn, all under conditions of temperature control. It will be observed, however, that the operation outlined above is thus reproduced inasmuch as the density of the excess bath remaining over must always exceed the hydrolyzing point, so as to be fit for the starting solution and the water is also added to the bath, either directly or in the form of $SnCl_4$ solution, so that this alternate proceeding falls distinctly within the process above fully described.

All aqueous solutions of stannic chlorid which are above or are not sufficiently diluted to reach the hydrolyzing point or a degree of concentration of the solution at which insoluble tin compounds are produced at the working temperature, are, for the purposes of this specification, denominated "strong solutions."

In and about chemical works the water which is used often may contain in solution more or less of the ingredients to be employed and though to all intents and purposes this is water, yet speaking accurately and in a technical sense, it is a weak solution which may be understood as complying with the terms of this issue and the invention extends to such use.

The process having thus been fully described, it will be readily understood that the ordinary variations, such as are dictated by the peculiar materials to be treated or conditions of practice obtaining at the time or in the locality where it is practiced, may be employed without departing from the spirit of the invention as defined in the claims.

I claim:

1. The process of producing clear aqueous solutions from anhydrous stannic chlorid, which consists in adding fuming stannic chlorid to a strong aqueous solution of stannic chlorid.

2. The process of producing clear aqueous solutions from anhydrous stannic chlorid, which consists in alternately adding fuming stannic chlorid and water to a strong aqueous solution of stannic chlorid while regulating the temperature.

3. The process of producing clear aqueous solutions from anhydrous stannic chlorid, which consists in adding fuming stannic chlorid to a strong aqueous solution of stannic chlorid and keeping the temperature of such solution below 105 degrees C.

4. The process of producing clear aqueous solutions from anhydrous stannic chlorid, which consists in alternately adding fuming stannic chlorid and water to a strong aqueous solution of stannic chlorid under conditions of temperature control, and keeping the concentration of the solution above that at which insoluble tin compounds are produced at the temperature.

5. The process of producing clear aqueous solutions from anhydrous stannic chlorid, which consists in alternately adding fuming stannic chlorid and water to a strong aqueous solution of stannic chlorid while regulating the temperature, and preventing the solution from falling to a point below 3% tin content.

6. The process of producing clear aqueous solutions from anhydrous stannic chlorid, which consists in alternately adding fuming stannic chlorid and water in this order to a strong aqueous solution of stannic chlorid, while regulating the temperature.

7. The process of producing clear aqueous solutions from anhydrous stannic chlorid, which consists in alternately adding fuming stannic chlorid and water to a strong aqueous solution of stannic chlorid, keeping the concentration of the solution above that at which insoluble tin compounds are produced at the temperature, continuing the process until an excess of solution has accumulated and utilizing such excess as a starting material in repeating the process.

ELMER A. SPERRY.

Witnesses:
ALICE MATTULLATH,
THOMAS F. EGAN.